(12) United States Patent
Norbert

(10) Patent No.: US 6,404,105 B1
(45) Date of Patent: Jun. 11, 2002

(54) CONTACTOR/CIRCUIT BREAKER ACTIVATED BY A PIEZOELECTRIC MOTOR

(75) Inventor: Beyrard Norbert, Neuilly sur Seine (FR)

(73) Assignee: Norbert Beyrard France, Paris (FR)

( * ) Notice: Subject to any disclaimer, the term of this patent is extended or adjusted under 35 U.S.C. 154(b) by 0 days.

(21) Appl. No.: 09/585,494

(22) Filed: Jun. 1, 2000

(30) Foreign Application Priority Data

Jun. 4, 1999 (EP) .......................................... 99401358

(51) Int. Cl.[7] .................................................. H02N 2/00
(52) U.S. Cl. .................................................. 310/323.17
(58) Field of Search .................................. 310/323.17

(56) References Cited

U.S. PATENT DOCUMENTS

| | | | |
|---|---|---|---|
| 3,989,964 A | 11/1976 | Gikow et al. ................ 310/8.1 |
| 4,042,967 A | * 8/1977 | Yamamoto .................... 361/45 |
| 4,473,859 A | * 9/1984 | Stone et al. ................... 361/93 |
| 4,620,124 A | * 10/1986 | Farrall et al. ................ 310/332 |
| 4,976,553 A | 12/1990 | Yamaguchi et al. ......... 400/124 |

FOREIGN PATENT DOCUMENTS

| | | | | |
|---|---|---|---|---|
| EP | 0 163 497 A | | 4/1985 | ............ H01P/1/12 |
| JP | 62-44-19 A | * | 2/1987 | ................ 310/319 |
| JP | 62-48220 A | * | 3/1987 | ................ 310/319 |

* cited by examiner

*Primary Examiner*—Thomas M. Dougherty
(74) *Attorney, Agent, or Firm*—Nawrocki, Rooney & Siverston, P.A.

(57) ABSTRACT

A contactor/circuit breaker type mechanism mounted on a main pulsating, preferably alternating, power line comprising two types of contacts, one active, the other passive, the active contacts being associated with opening and closing activation means comprising at least one piezoelectric motor driven by control means.

16 Claims, 3 Drawing Sheets

CONTACTOR/CIRCUIT BREAKER ACTIVATED BY A PIEZOELECTRIC MOTOR

The invention relates to a contactor/circuit breaker mounted on a main pulsating, preferably alternating, electric power line, and its activation method. According to other aspects, the invention relates to a device for activating a movable part intended for a contactor/circuit breaker type mechanism and to the application of piezoelectric motors to the activation of electrical contacts.

Contactors/circuit breakers are already known comprising two types of contact, one active, the other passive, whose active contacts are activated by an electromechanical system such as an electromagnet.

Such mechanisms are designed to provide both the putting into and taking out of service of the circuit and its protection in the event of overcurrent in the main power line.

However, this type of mechanism does not give complete satisfaction, since it has on the one hand a significant mechanical and electrical inertia, and on the other hand a sensitivity to the electromagnetic field created by the main power line, these two phenomena preventing accurate control in time and space of the movable contacts.

This results in the occurrence of significant electric arcs at the time of opening the contacts and limiting of the current range within which the circuit is protected.

The invention therefore aims to remedy these drawbacks.

To that end, and according to a first aspect, it provides for a device for activating a movable part intended for a contactor/circuit breaker type mechanism in which the activation means comprise at least one piezoelectric motor driven by control means.

According to a second aspect, it provides for a contactor/circuit breaker type mechanism mounted on a main pulsating, preferably alternating, power line comprising two types of contact, one active, the other passive, the active contacts being associated with opening and closing activation means comprising at least one piezoelectric motor driven by control means.

According to a first variant, the piezoelectric motor is a linear motor and the active contacts are associated with one end of a contact carrier arm mounted rotationally around an axis, the activation means being disposed in proximity to the second end of the contact carrier arm.

According to a second variant, the piezoelectric motor is a rotary motor and the active contacts are associated with one end of a contact carrier arm mounted rotationally around an axis, the activation means being on the axis of rotation of the contact carrier arm.

In these two variants, a return spring can be associated with the end of the contact carrier arm situated on the opposite side to the active contacts with respect to the axis of rotation.

In one embodiment, the means of activating the active contacts comprise two piezoelectric linear motors, one for opening, the other for closing.

According to a variant, the active contacts are associated with one end of a contact carrier arm mounted rotationally around an axis, one of the piezoelectric linear motors being disposed on the same side of the axis of rotation as the active contacts, and the other being disposed in proximity to the second end of the contact carrier arm. A return spring is associated with the contact carrier arm in order to facilitate the opening and closing of the contacts by the activation means.

In another embodiment, the passive contacts are mounted translationally on a spring along the axis of displacement of the active contacts.

In one embodiment, the control means of the piezoelectric motor comprise, in series, a mechanical and/or electronic trigger circuit for requesting opening/closing of the main power line, a switching device, a programmable delay line and an electric generator energizing the piezoelectric motor.

In a supplementary embodiment, the control means of the piezoelectric motor comprise, in series, a device detecting overcurrent in the main power line, a switching device, a programmable delay line and an electric generator energizing the piezoelectric motor.

In a variant of these two embodiments, the control means of the piezoelectric motor comprise a single switching device, a single programmable delay line and a single electric generator energizing the piezoelectric motor.

The switching device comprises a means of detecting the current and/or voltage of the main power line and a comparator which energizes the control circuit of the piezoelectric motor when the value of the current and/or voltage detected is equal to a certain reference value.

The device detecting overcurrent in the main power line comprises a means of detecting the current in the main power line and a comparator which energizes the control circuit of the piezoelectric motor when the value of the current detected is greater than or equal to a certain threshold value.

According to a third aspect, the invention provides for the application of piezoelectric motors to the activation of electrical contacts.

According to a fourth aspect, the invention provides for a method of activating a mechanism according to the invention, in which, the main circuit being closed, it comprises the following successive steps:

mechanical and/or electronic triggering of the request for opening the main power line;

detecting the current in the main power line;

switching the first time the current in the main power line goes to the reference value;

energizing the delay line programmed previously according to the reference value and the speed of displacement of the piezoelectric motor;

energizing the electric generator;

triggering the opening of the contacts at an instant where the current in the main power line is equal to a certain value, notably close to zero.

When the main circuit is open, the method comprises the following successive steps:

mechanical and/or electronic triggering of the request for closing the main power line;

detecting the voltage in the main power line;

switching the first time the voltage in the main power line goes to the reference value;

energizing the delay line programmed previously according to the reference value and the speed of displacement of the piezoelectric motor;

energizing the electric generator;

triggering the closing of the contacts at an instant where the voltage in the main power line is equal to a certain value, notably close to zero.

In a variant, when the main circuit is closed, the method comprises the following successive steps:

detecting the current in the main power line;

comparing the measured current value with a threshold value;

If the value of the current measured on the main power line is greater than the threshold value:

switching the first time the current in the main power line goes to the reference value;

energizing the delay line programmed previously according to the reference value and the speed of displacement of the piezoelectric motor;

energizing the electric generator;

triggering the opening of the contacts at an instant where the current in the main power line is equal to a certain value, notably close to zero.

Other objects and advantages of the invention will emerge in the course of the description which follows with reference to the accompanying drawings, illustrating various embodiments, drawings in which.

Figure 1:
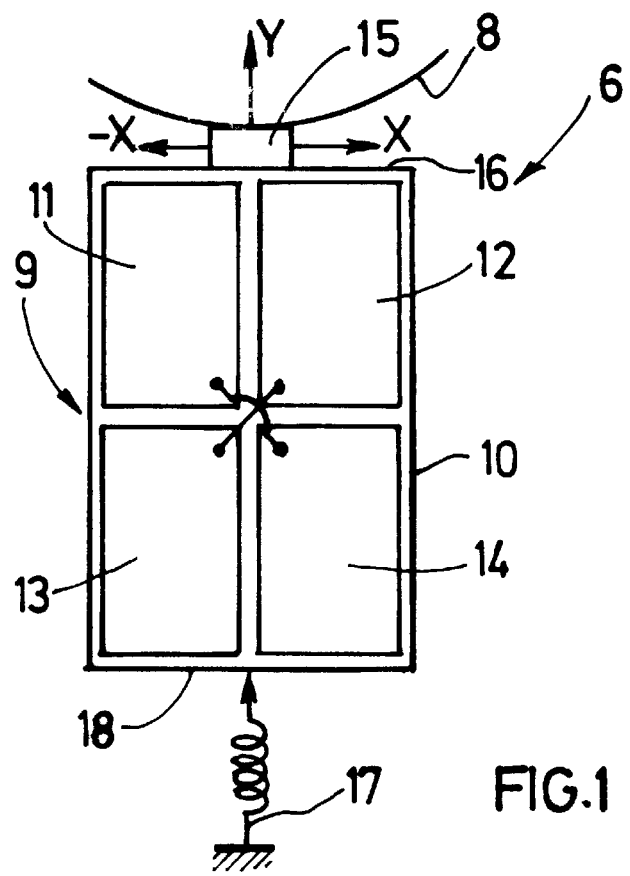
FIG. 1 is a simplified view of a piezoelectric motor or with elliptical vibration.

A contactor/circuit breaker 1 comprises two types of contact, one active 2 and the other passive 3, and means of activating 4 the active contacts 2.

This mechanism is intended to be mounted on a main power line 5 of an electrical circuit in order to provide the means of putting it into and taking it out of service, and moreover provide its protection in the event of overcurrent.

The electrical circuit can be of any type used in the electrical industry and will therefore not be described any further in this description.

The activation means 4 provide the displacement of the active contacts 2, on the one hand into a position where they touch the passive contacts 3 in order to provide the passage of current in the circuit, and on the other hand a position where the passive contacts 3 are moved away in order to interrupt the electrical supply of the main circuit. These two states make it possible to define respectively the closed circuit and open circuit situations.

The means of activating 4 the active contacts 2 comprise a piezoelectric motor 6 driven by control means 7. The transmission of the movement of the motor 6 to the active contactor 2 is carried out by means of a movable part 8, 21.

Some embodiments of the different components of the activation means 4 will now be described.

One piezoelectric motor 6 usable in the invention is an elliptical vibration motor 9 displacing a movable part 8. Such a motor is described for example in the European patent application EP-A-0 633 616, filed by the NANOMOTION company.

FIG. 1 depicts schematically such a motor 9 comprising a rectangular parallelepiped 10 of a piezoelectric ceramic having a small thickness compared to its length (direction Y). Four electrodes 11, 12, 13, 14 are disposed on a first large face of this parallelepiped to form a chequered pattern of rectangles, each covering approximately one quarter of the surface of said first face. The two electrodes 11, 14 and 12, 13 placed diagonally with respect to one another are connected electrically by wires.

The second face, opposite the first, is completely covered by a single electrode which is, for example, left at earth potential during operation of the motor 6. A movement transmission element 15 made of hard ceramic is associated with one of the small sides 16 (direction X) of the piezoelectric ceramic rectangular parallelepiped 10. The movement transmission element 15 can, for example, be affixed to the middle of said small side 16.

In one embodiment of this type of piezoelectric motor 9, a spring 17 is compressed on the small side 18 opposite the one supporting the transmission element 15. Such an arrangement makes it possible to exert pressure from the transmission element 15 on the movable part 8.

The operation of such a motor 9 is then obtained by energizing the piezoelectric element 10 with a current of frequency capable of exciting these resonant modes along the direction X (DX) and along the direction Y (DY).

In order to obtain a movement of the movable part 8 in the direction X (towards the right in FIG. 1), the electrodes 12 and 13 are energized with such a current, and the electrodes 11 and 14 are left at earth potential.

Figure 2:
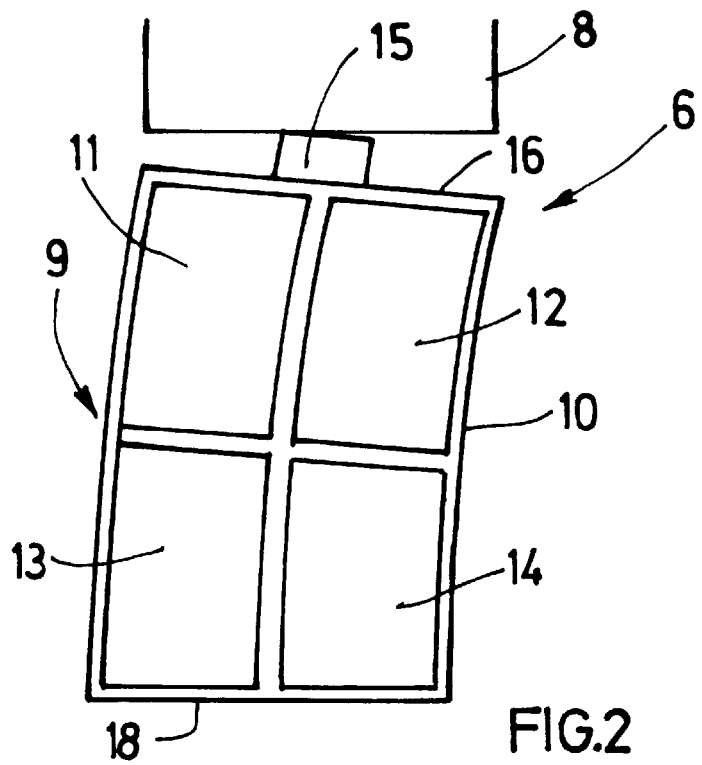
FIG. 2 depicts the deformation of the piezoelectric element of such a motor induced by the excitation current.

Such a configuration first causes deflection of the piezoelectric element 10 (see FIG. 2) on one part of the current cycle. The movable element 8 is then displaced in the direction X by means of the pressure exerted by the spring 17 on the piezoelectric element 10.

The response time of the spring 17 being less than the excitation frequency of the piezoelectric element 10, the transmission element 15 is no longer in contact with the movable part 8 in the part of the cycle where the piezoelectric element 10 flexes in the opposite direction (–X) to the movement desired for the movable part 8.

The repetition of this cycle induces an elliptical rotation of the transmission element 15 in the plane XY. This movement is transmitted to the movable part 8 in order to cause its displacement.

To improve this transmission, the area of the movable part 8 in contact with the transmission element 15 can be covered with a friction plate made of ceramic material.

To obtain a movement of the movable part 8 in the direction –X, the electrodes 11 and 14 are energized, and the electrodes 12 and 13 are left at earth potential in order to obtain a flexing in the opposite direction of the piezoelectric element 10.

In a first variant implementation, the movable element 8 is flat along the direction X in order to obtain a linear displacement motor 9.

In a second variant implementation, the movable element 8 is cylindrical or spherical in order to obtain a rotary piezoelectric motor 9.

In an example embodiment of such a piezoelectric motor 9, the piezoelectric parallelepiped 10 is made of PZT (titanate and zirconate of lead) and has a length of 30 mm, a width of 7 mm and a thickness of 3 mm. The energizing power has a potential between 30 and 500 V and a frequency between 20 and 100 kHz.

Such motors 9, manufactured notably by the NANOMOTION company, can displace a movable element 8 translationally at a speed greater than 30 cm/s by applying a force of 15 newtons.

This force can be increased by putting in parallel a number of these motors 9, acting simultaneously, so as to allow forces which may reach several hundred newtons.

Figure 3:
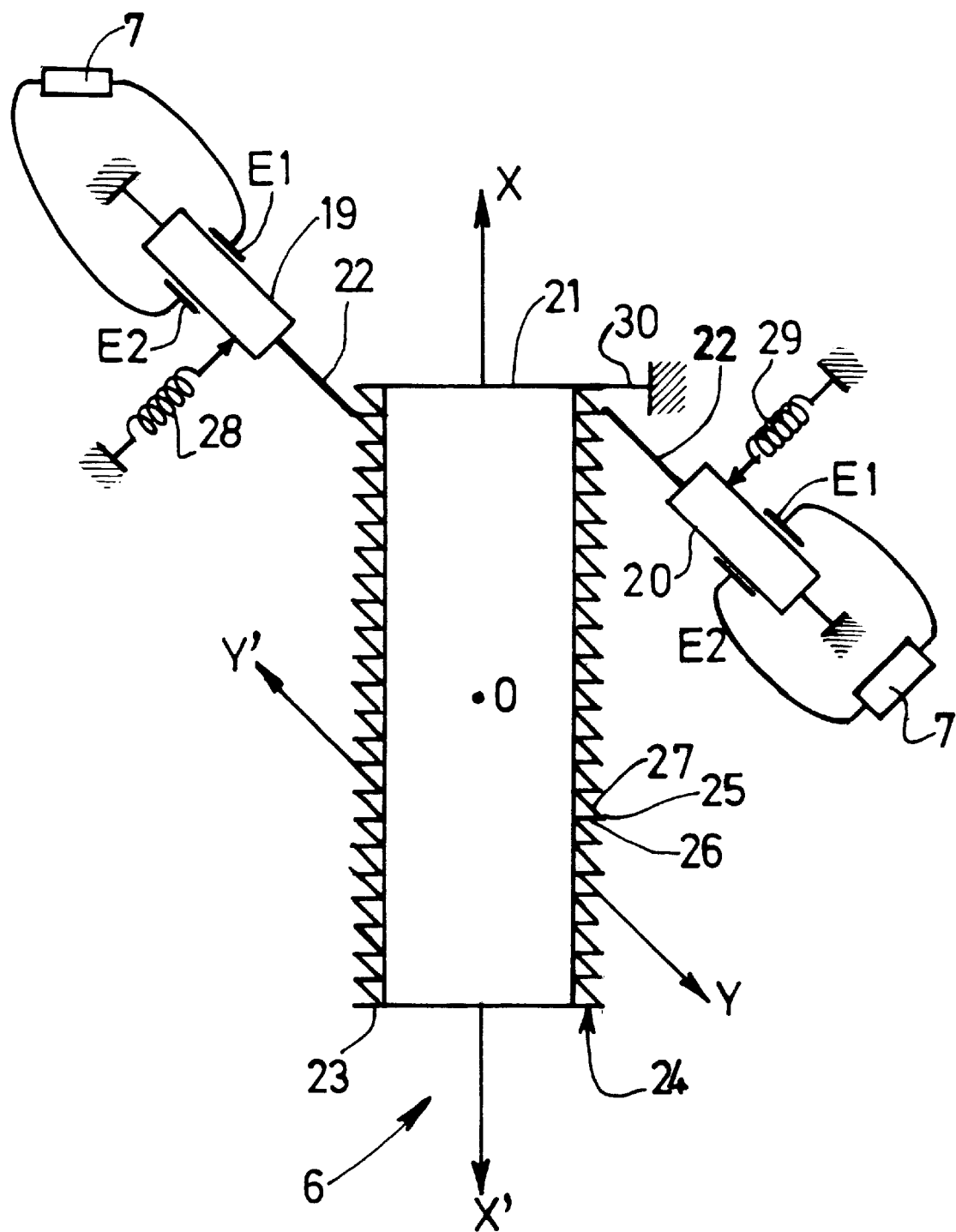
FIG. 3 depicts schematically a second embodiment of piezoelectric motor usable in the invention.

FIG. 3 shows schematically a second embodiment of a piezoelectric motor 6 usable in the invention.

It comprises two bars 19, 20 made of piezoelectric ceramic, disposed either side of an element 21 movable translationally along the direction XX'. Each of these bars 19, 20 is energized with electricity by two electrodes E1 and E2.

On the end of these bars 19, 20 which are situated facing the movable element 21, there is disposed a rod 22 for transmitting the deformation of the bars.

The movable element 21 is of rectangular parallelepiped form and has two micro toothed racks 23, 24 extending in the direction XX' on each side of the long length of the movable element 21.

Each of these micro toothed racks 23, 24 is formed from a series of dihedrals 25 having a first surface 26 perpendicular to the direction XX' and a second surface 27 forming an acute angle (direction YY'), for example of the order of 45°, with said first surface 26.

In the embodiment depicted, the two piezoelectric bars 19, 20 are respectively disposed along the direction YY', that is to say parallel to said second surfaces 27 of each of the two micro toothed racks 23, 24.

The two micro toothed racks 23, 24 are arranged for example symmetrically with respect to the centre O of the movable element 21.

The two piezoelectric bars 19, 20 are energized by an alternating current of frequency capable of exciting their resonance along their direction YY' (DY).

A vibration movement of the piezoelectric bars 19, 20 in the direction YY' is thus obtained.

In the part of the cycle where the piezoelectric bar 19, 20 lengthens in the direction YY', the rod 22 transmitting the deformation comes into contact with the surface 26 of the micro toothed rack 23, 24 in order to cause the displacement of the movable element 21 in the direction XX'.

In the second part of the cycle, the piezoelectric bar 19, 20 contracts in order to disengage the transmission rod 22 from the micro toothed rack 23, 24 along a surface 27 parallel to the direction YY' without causing any substantial movement of the movable element 21.

In the next cycle, the transmission rod 22 engages in the next dihedral 25 of the micro toothed rack 23, 24 for a continuous linear movement of the movable element 21 in one direction. The passage from one dihedral 25 to another may be facilitated by the action of a spring 28, 29 being exerted on the piezoelectric bar 19, 20 in the opposite direction to the displacement of the movable element 21.

The principle of operation of such a motor 6 is then to energize one of the piezoelectric bars 20 in order to obtain a translation in the direction X of the movable element 21, and then the second 19 in order to obtain a translation in the direction X'.

In a variant (not depicted), the movable element 21 of such a piezoelectric motor 6 can comprise a single micro toothed rack 23 providing translation in the direction X, the return in the direction X' of the movable element 21 being provided by a spring provided at one of its ends.

In a supplementary variant, a two-position non-return stop 30 can be provided. It can be formed from a flexible blade engaging in the successive dihedrals 25 at the time of displacement of the movable element 21 and being sufficiently rigid to hold it in position when the piezoelectric bars 19, 20 are no longer energized.

In one example embodiment of such a piezoelectric motor 6, the piezoelectric bars 19, 20 and the transmission rods 22 are made of PZT and have a length between 2 and 20 cm. The depth of the dihedrals 25 of the micro toothed racks 23, 24 is of the order of 0.5 to 5 µm. The energizing power of the piezoelectric elements 19, 20 has a voltage of the order of 220 V and a frequency between 10 and 200 kHz.

Such motors 6 are capable of supplying forces which can vary between 3 and 15 newtons. They are therefore more particularly intended for relay type contactors/circuit breakers 1 which operate for nominal currents of the order of a few amperes in the main circuit.

In one embodiment of the contactor/circuit breaker 1, the active contacts 2 are associated with one end 31 of a contact carrier arm 32, mounted rotationally around an axis 33 and the passive contacts 3 are mounted translationally on a spring 34 along the axis of displacement of the active contacts 2.

In one example implementation, the contactor/circuit breaker 1 is activated by a rotary piezoelectric motor 6, the contact carrier arm 32 being associated with the movable element 8 of the piezoelectric motor 6 in order to cause its rotation.

Figure 4:
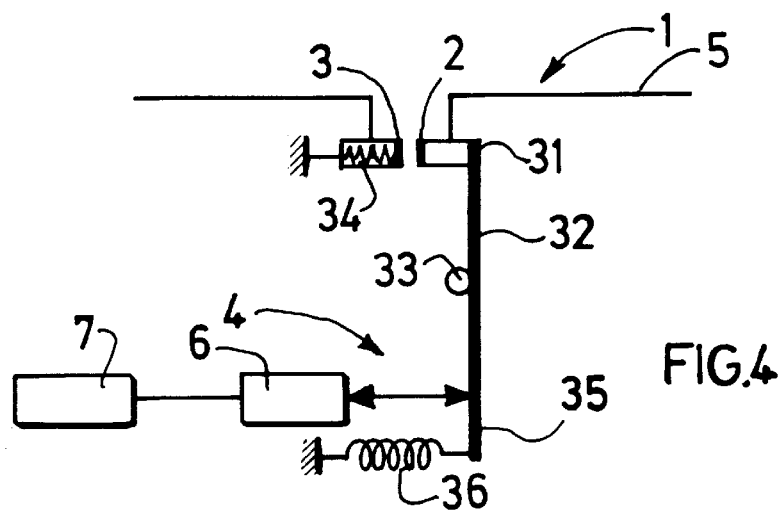
FIG. 4 depicts one embodiment of a contactor/circuit breaker according to the invention.

In a second example implementation (see FIG. 4), the contactor/circuit breaker 1 is activated by a linear piezoelectric motor 6, the movable element 8, 21 being disposed in proximity to the end 35 of the contact carrier arm 32 opposite the active contact 2 in order to benefit from leverage.

The movable element 8, 21 can either be associated with the contact carrier arm 32 to obtain a double effect activation, or left free. In this case, a return spring 36 can be disposed on the end 35 of the contact carrier arm 32 opposite the active contact 2.

Closure of the contacts 2, 3 is then obtained by controlling the linear piezoelectric motor 6 so that, first, it compensates for the force caused by the return spring 36, and second, it induces a given pressure between the contacts 2, 3.

Any bounce of the contacts 2, 3 at the moment of closure can thus be avoided, obviously decreasing the arcs which bounce can bring about.

When the linear piezoelectric motor 6 is no longer energized, the return spring 36 will bring about opening of the contacts 2, 3.

Figure 5:
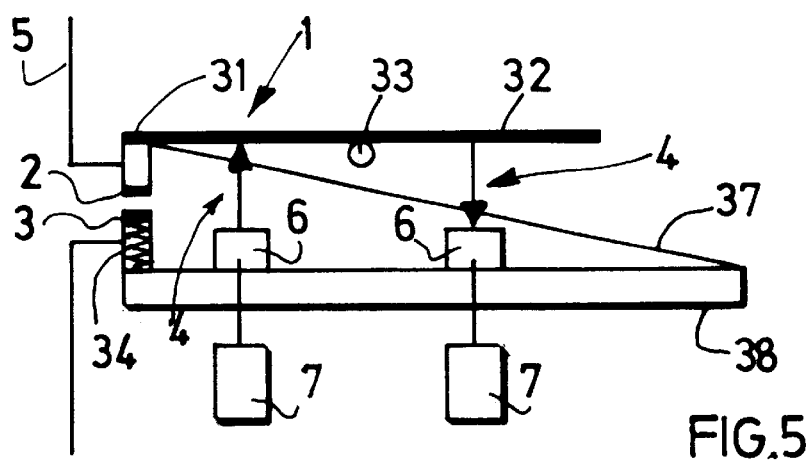
FIG. 5 depicts a second embodiment of a contactor/circuit breaker according to the invention.

In a third example implementation (see FIG. 5) the contactor/circuit breaker 1 is activated by two linear piezoelectric motors 6, one for opening, the other for closing, disposed either side of the axis 33 of rotation of the contact carrier arm 32.

To facilitate activation of the contacts 2, 3, a spring 37 can be associated either side of the axis 33 of rotation of the contact carrier arm 32 on the support 38 of the passive contacts 3 and on the contact carrier arm 32 in proximity to the active contacts 2.

This arrangement is designed so that, when the contacts 2, 3 are closed, the linear piezoelectric motor 6 opens the circuit until the axis of the spring 37 is in a position such that it facilitates the displacement of the active contacts 2 in the opening direction.

For closing the contacts, the second linear piezoelectric motor 6 displaces the contact carrier arm 32 until the spring 37 applies a pressure in the closing direction.

The control means 7 of the piezoelectric motor 6 comprise a generator 39 of alternating or pulsating current at an excitation frequency of the piezoelectric element.

In one embodiment (see FIG. 6), the control means 7 of the piezoelectric motor 6 comprise, in series, on the one hand a mechanical and/or electronic trigger circuit 40 requesting opening and a device 41 detecting overcurrent in the main power line 5 mounted in parallel and on the other hand, a switching device 42, a programmable delay line 43 and an electric generator 39.

This assembly makes it possible to provide both the contactor function and the circuit breaker function while controlling the opening or closing of the contacts 2, 3 at a precise instant.

In an example implementation, the opening/closing request trigger circuit 40 is a mechanical or electronic switch. The overcurrent detector 41 is a bimetallic strip designed to trip when the current in the main power line 5 exceeds a certain threshold value, for example of the order of a few times the nominal current.

Figure 6:
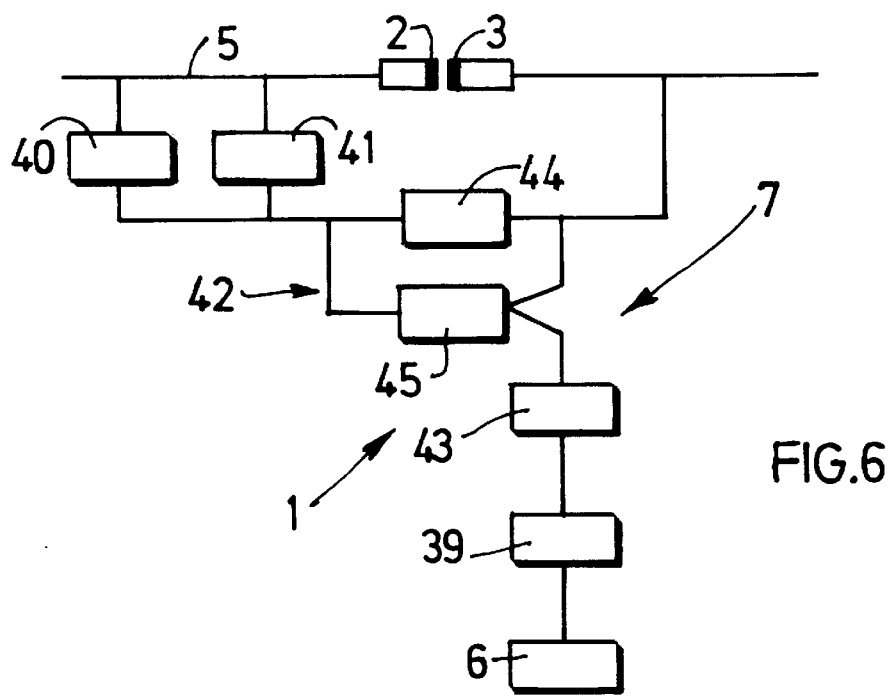
FIG. 6 depicts a functional diagram of the control means of one of the piezoelectric motors according to the first or second embodiment.

In FIG. 6, the bimetallic strip has a current tapped off from the main current passing through it. However, it can be placed directly in the main current so that its deformation is determined directly by the intensity of the main current.

The switching device 2 comprises a resistor 44 mounted in parallel with the main power line 5 either side of the active contacts 2 and passive contacts 3, so as to be always energized by the main current, whether the circuit is open or closed.

At the terminals of his resistor 44, a zero-threshold reverse switching ransistor 45 is provided for energizing the delay line 43 when the current intensity is zero.

The programmable delay line 43 comprises a variable capacitor which is adjustable within the desired time range.

The electric generator 39 is a generator of alternating or pulsating current with an excitation frequency of the piezoelectric element.

An example of activation of a contactor/circuit breaker type mechanism 1 activated by a piezoelectric motor 6 controlled by such a circuit is then as follows.

The circuit being open, the switch 40 is activated in order to energize the resistor 44. When zero voltage is reached for the first time, the transistor 45 energizes the delay line 43.

Where the frequency of the current in the main line is 50 Hz, and the time of displacement of the piezoelectric motor 6 for causing activation of the contactor/circuit breaker 1 is 3 msec, the delay line 43 is then programmed to produce a delay of 7 msec.

This is because the duration of a half-cycle of a 50 Hz current is 10 msec. The energizing of the motor is therefore carried out 3 msec before the current passes through zero again.

In this configuration, closure of the contacts 2, 3 is therefore carried out at zero voltage.

When the circuit is closed, either the switch 40 (contactor), or the bimetallic strip 41 (circuit breaker) can energize the resistor 44.

With the delay line 3 still programmed at 7 msec and the displacement of he piezoelectric motor 6 being 3 msec, the opening of the contacts 2, 3 takes place at zero current, which limits the formation of electric arcs.

By virtue of the high accuracy of activation in time and space of the controlled piezoelectric motors 6, a contactor/circuit breaker 1 can thus be obtained which operates both in the nominal current range of the main power and in the "short circuit" range, opening or closing the circuit at zero current, preferably in a half period, so as to limit the creation of an electric arc and the passage of a current which is dangerous to the controlled circuits.

What is claimed is:

1. A contactor/circuit breaker mechanism mounted on a main, pulsating power line having at least one active contact associated with opening and closing activation means, said opening and closing activation means comprising at least one piezoelectric motor driven by control means, characterised in that the control means comprise, in series, trigger circuit for requesting opening and closing of the main power line, a switching device, a programmable delay line and an electric generator energizing the piezoelectric motor.

2. A mechanism according to claim 1, characterised in that the piezoelectric motor is a linear motor.

3. A mechanism according to claim 1, characterised in that the piezoelectric motor is a rotary motor.

4. A mechanism according to claim 2, characterised in that the active contacts are associated with a first end of a contact carrier arm disposed for rotation with respect to an axis, the activation means being positioned proximate a second end of the contact carrier arm.

5. A mechanism according to claim 4, characterised by the fact that a return spring is associated with the second end of the contact carrier arm and connected on the opposite side from the active contacts with respect to the axis of rotation.

6. A mechanism according to claim 1, characterised in that the activation means comprises two piezoelectric linear motors, one for opening and the other for closing.

7. A mechanism according to claim 6, characterised in that the active contacts are associated with a first end of a contact carrier arm disposed for rotation with respect to an axis, one of the piezoelectric linear motors being disposed on the same side of the axis of rotation as the active contacts, and the other being disposed proximate a second end of the contact carrier arm.

8. A mechanism according to claim 7, characterised in that a return spring is associated with the contact carrier arm in order to facilitate the opening and closing of the contacts by the activation means.

9. A mechanism according to claim 1, characterised in that the mechanism comprises at least one passive contact mounted translationally on a spring along the axis of displacement of the active contacts.

10. A mechanism according to claim 1, characterised in that the control means of the piezoelectric motor comprise a device for detecting overcurrent in the main power line, a switching device, a programmable delay line and an electric generator energizing the piezoelectric motor.

11. A mechanism according to claim 10, characterised in that the control means of the piezoelectric motor comprise a single switching device, a single programmable delay line and a single electric generator energizing the piezoelectric motor.

12. A mechanism according to claim 10, characterised in that the switching device comprises means for detecting the current and voltage of the main power line and a comparator which energizes the control circuit of the piezoelectric motor when the value of the current and voltage detected exceeds a reference value.

13. A mechanism according to claim 10, characterised in that the device for detecting overcurrent in the main power line comprises means for detecting the current in the main power line and a comparator which energizes the control circuit of the piezoelectric motor when the value of the current detected is greater than a certain threshold value.

14. A method of activating a mechanism according to claim 12, characterized in that, when the main circuit is closed, the mechanism performs the following successive steps:

triggering of the request for opening the main power line;
detecting the current in the main power line;
switching the first time the current in the main power line goes to the reference value;
energizing the delay line programmed previously according to the reference value and the speed of displacement of the piezoelectric motor;
energizing the electric generator; and
triggering the opening of the contacts at an instant where the current in the main power line is equal to a value approximating zero.

15. A method of activating a mechanism according to claim 12, characterised in that, when the main circuit is open, the mechanism performs the following successive steps:

triggering of the request for closing the main power line;

detecting the voltage in the main power line;

switching the first time the voltage in the main power line goes to the reference value;

energizing the delay line programmed previously according to the reference value and the speed of displacement of the piezoelectric motor;

energizing the electric generator; and triggering the closing of the contacts at an instant where the voltage in the main power line is equal to a value approximating zero.

16. A method of activating a mechanism according to claim 13, characterised in that, when the main circuit is closed, the mechanism performs the following successive steps:

detecting the current in the main power line;

comparing the measured current value with a threshold value;

and, if the value of the current measured on the main power line is greater than the threshold value:

switching the first time the current in the main power line goes to the reference value;

energizing the delay line programmed previously according to the reference value and the speed of displacement of the piezoelectric motor;

energizing the electric generator; and triggering the opening of the contacts at an instant where the current in the main power line is equal to a value approximating zero.

* * * * *